INVENTORS
GEORGE AUGER & GUSTAV A. FINGADO

INVENTORS
GEORGE AUGER & GUSTAV A. FINGADO

Sept. 29, 1964 G. AUGER ET AL 3,150,378
AUTOMATIC STAPLE OR FASTENER FEEDING MECHANISM
Filed June 4, 1962 5 Sheets-Sheet 4

INVENTORS
GEORGE AUGER & GUSTAV A. FINGADO
BY

*INVENTORS*
GEORGE AUGER & GUSTAV A. FINGADO

United States Patent Office 3,150,378
Patented Sept. 29, 1964

3,150,378
AUTOMATIC STAPLE OR FASTENER
FEEDING MECHANISM
George Auger, Paterson, N.J., and Gustav A. Fingado,
Ho-Ho-Kus, N.J. (151 Linwood Ave., Paterson, N.J.),
assignors, by mesne assignments, to Gustav A. Fingado,
Ho-Ho-Kus, N.J., and Marie Auger, Paterson, N.J.
Filed June 4, 1962, Ser. No. 199,741
19 Claims. (Cl. 1—49.5)

This invention relates to fastening devices and more particularly to automatic means for feeding staples or analogous fastening devices to the stapling apparatus or gun.

Power operated staplers possess the capability of high speed and relatively effortless operation which adapts them for use in applications in fabricating and assembly operations where a large number of fastener driving operations must be preformed in a relatively short period of time. However, due to inadequate fastener feeding devices (now in use) namely, those which hold relatively few fastening devices and feed them to the stapler or fastener applying device, many of the advantages of high speed operation of the stapler is lost because of the necessity of quite frequently filling the staple or fastener feeding device with a fresh supply of staples. This cuts down the efficiency of operation of the stapler, adds to labor costs of production, and time consumed.

The present invention relates to a mechanism for feeding pre-formed fasteners, such as staples, nails, hogrings or other pre-formed fasteners to the stapling device.

Hereinafter the fastener applying apparatus will be referred to as a stapling device or gun, which is to be understood to be of any suitable type now purchasable on the open market and one which is power operated either by pressure air, electrically operated means or any suitable source of energy which can be employed to drive such a fastening device; also hereinafter the term staple as used is to be considered to apply to preformed staples, nails, hogrings or any other suitable fastening device now or hereafter employed in the art.

An object of the present invention is to provide a staple feeding device embodying a staple magazine, preferably in the form of a plurality of staple carrying chambers or magazines capable of holding thousands of staples (such as a sufficient quantity to supply the stapling gun for high speed operation for an entire day) and to provide mechanisms which will automatically feed a full magazine into staple feeding position upon the emptying of a preceding magazine.

Other objects of the invention are to provide means to insure that the magazine moved into staple feeding position is provided with a supply of staples; to insure the proper feeding of the staples to the stapling gun, and one which provides for installing as many staples as desired in the magazines, as determined by the application to which the stapling gun is applied.

Further the present invention comprehends a staple feeding mechanism which will permit the stapling gun to be placed in any desired position, such as vertically above or below the work zone, horizontally on either side of center or at any angle therebetween, depending upon the position or nature of the object to which the staples are applied.

Other objects and advantages of the present invention will become apparent from a consideration of the following detailed description taken in conjunction with the accompanying drawings; wherein.

Figure 1:
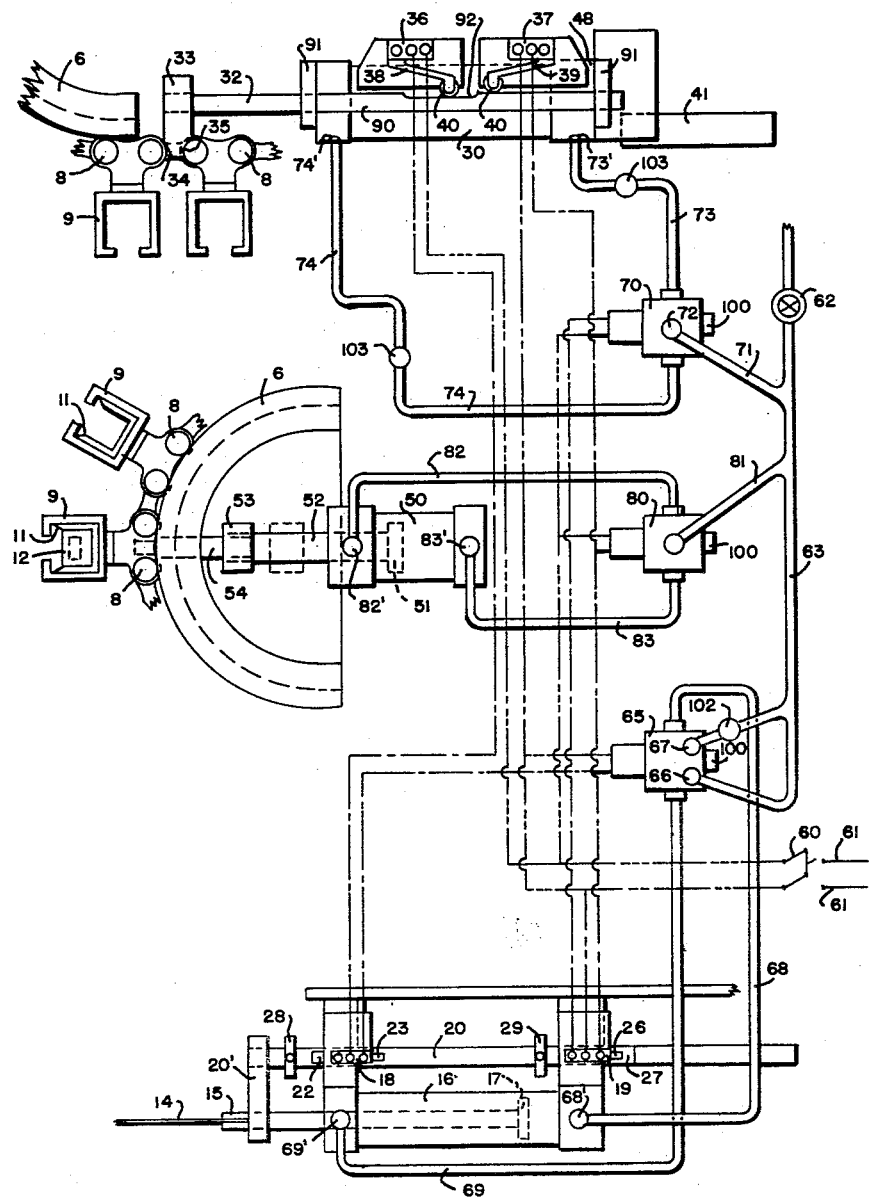
FIGURE 1 is a diagrammatic layout illustrating the relationship and sequence of operation of various parts of the automatic staple feeding apparatus.

Referring particularly to the drawings wherein (particularly in FIGURES 2 and 3) certain parts which would normally appear in both views are omitted in one or the other of the views for purposes of clarification, but the relationship of all parts are shown in the diagrammatic FIGURE 1 of the drawings where their co-relationship is clearly shown.

In general terms the staple feeding mechanism of the present invention comprises two main operating mechanisms and an auxiliary mechanism co-operating with the other two.

The two main mechanisms are that for feeding staples from the magazines to the stapling machine and that for bringing the magazines into staple feeding position, while the third co-operating mechanism comprises means for accurately locating and maintaining a magazine in such properly located position while the staples therein are dispensed.

The staple feeding apparatus includes a front plate 1 and a back plate 2.

A staple gun or stapler 3 is attached to the front plate 1 by suitable attaching plates 4, so that its staple feeding chute 5 will be accurately located to receive staples (not shown) from the feeding mechanism. The stapling gun 3 may be of any suitable type which may be purchased on the open market and of the power operated type. That is, it may be operated by air under pressure, electricity or any other suitable source of energy.

Figure 2:
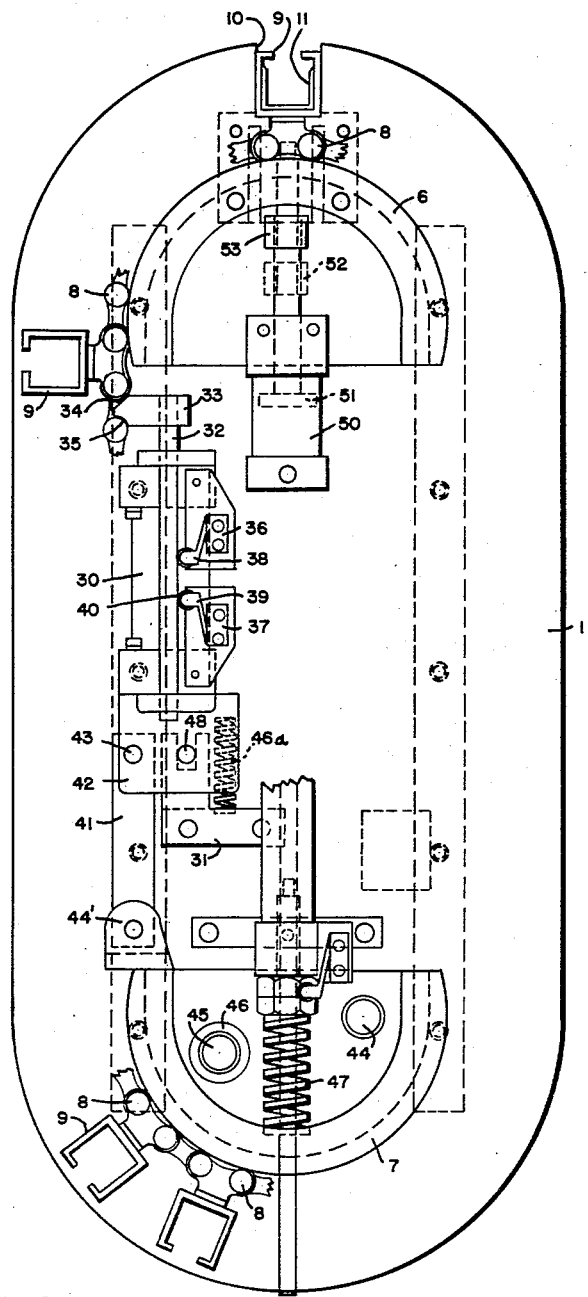
FIGURE 2 is a side view, having parts broken away, with one cover plate removed, and showing particularly the mechanism for moving the magazines into staple dispensing position and for accurately positioning and holding the magazines in such position.
Figure 3:
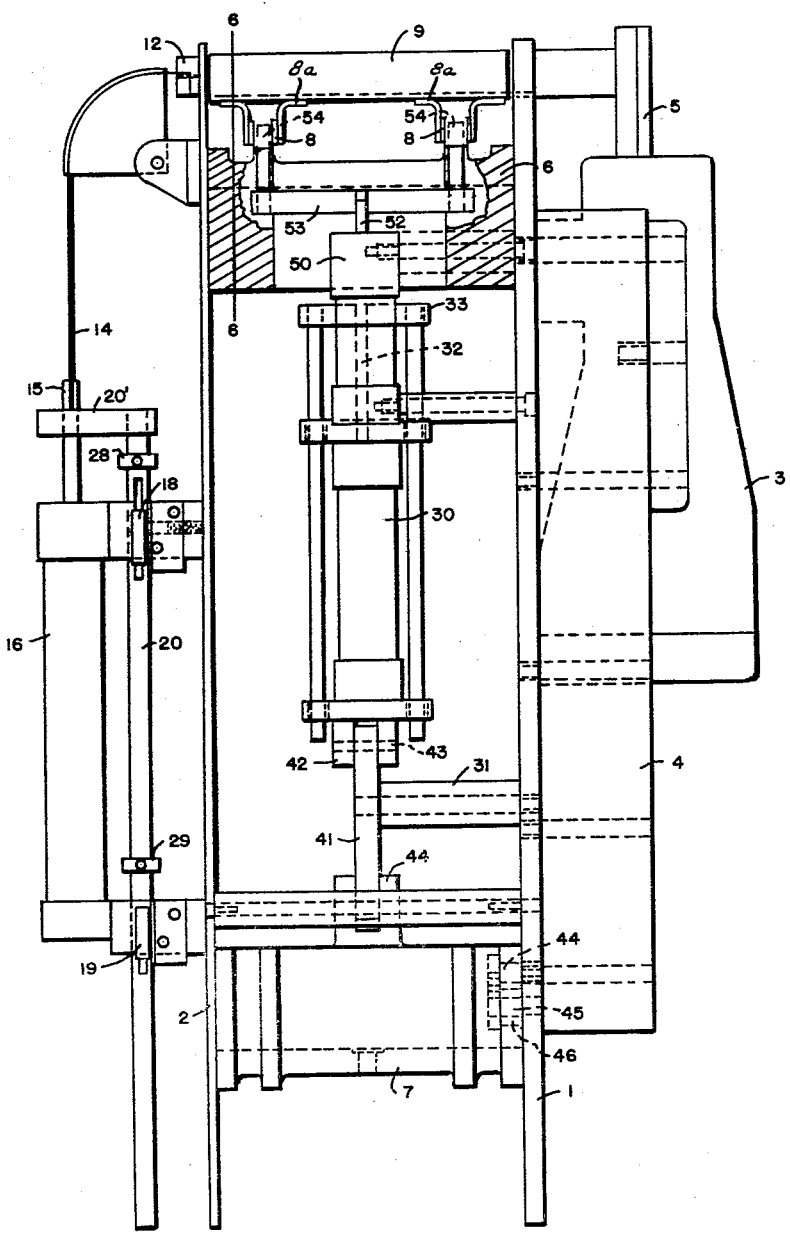
FIGURE 3 is a view similar to FIGURE 2, only showing the mechanism for feeding the staples into the stapling gun and showing part of the mechanism shown in side elevation in FIGURE 2 in edge elevation.

Between the front plate 1 and the back plate 2 are positioned arcuate guides 6 and 7 which are located near the ends of the plates. Roller chains 8 pass about the guides 6 and 7. These roller chains are continuous, however, only fragments of them are shown in FIGS. 2 and 3 for purposes of permitting a clear showing of other parts of the mechanism. The roller chains are spaced one from the other as clearly shown at the top of FIG. 3 and the alternate links thereof have attaching plates 8a thereon to which are attached staple carrying magazines 9. The magazines 9 extend from one chain to the other between the front and back plates 1 and 2 and these plates are cut away as shown at 10 in FIGURE 2 of the drawings. The cut out 10 in the front plate 1 aligns accurately with the receiving opening (not shown) in the staple feed chute 5 of the stapling gun 3.

When a magazine 9 is in position to feed staples 11

(see FIG. 2) therefrom into the chute 5 the staple feeding mechanism comes into operation.

Figure 4:
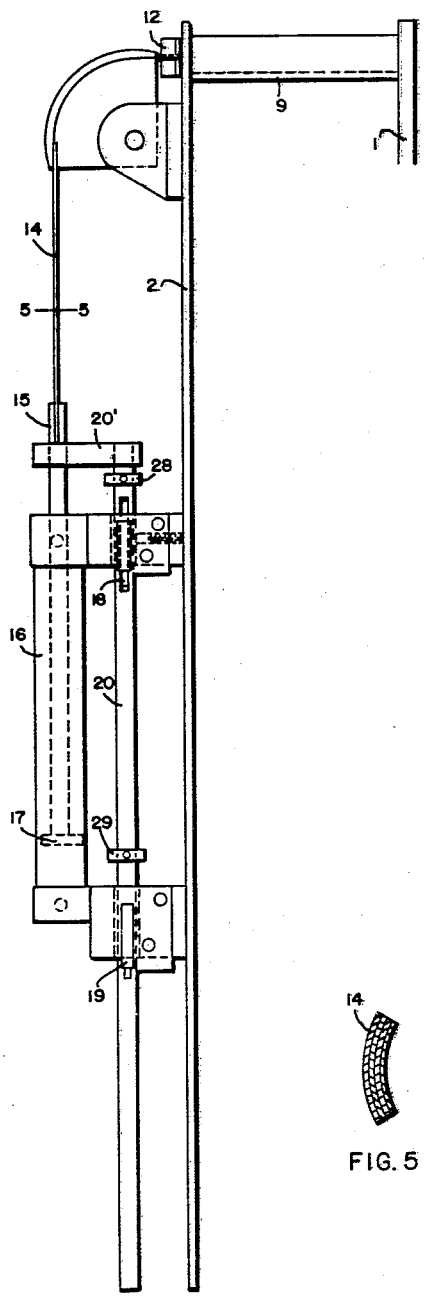
FIGURE 4 is a detail view of the staple feeding mechanism.
Figure 5:
FIGURE 5 is a detail cross section taken on line 5—5 of FIGURE 4.
Figure 6:
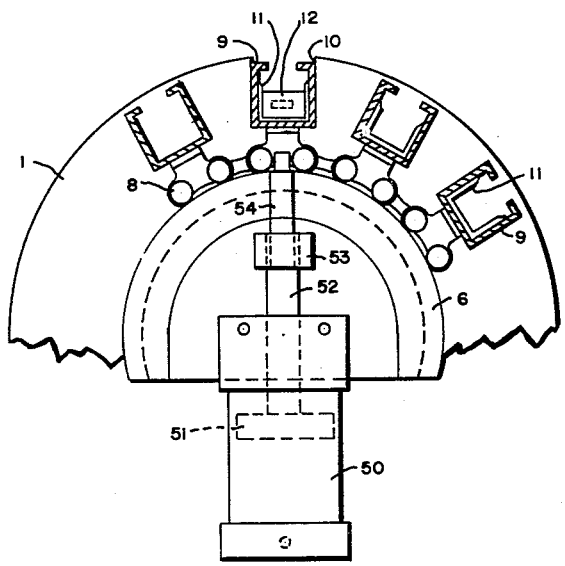
FIGURE 6 is a detail section taken on line 6—6 of FIGURE 3.

The staple feeding mechanism includes a staple moving plunger 12 which is shown at its starting position in FIGS. 3 and 4, and 6. The plunger 12 is of such size that it will move freely through the magazine and push staples therein ahead of it, and out into the chute 5. The plunger has a connecting member 14 connected thereto in any suitable manner and to the piston rod 15 of the feed cylinder mechanism 16. Due to the fact that for conservation of space in the apparatus, the element or member 14 must travel in a path for moving the plunger 12 at right angles to the path of its movement with the piston rod 15 it is formed (to provide sufficient strength, flexibility and rigidity to perform its function) of a plurality of laminated flexible, slightly arcuate steel strips as clearly shown in FIGURE 5 of the drawings.

The piston 17 of the feed cylinder structure 16 is moved by suitable power fluid (preferably air under pressure) and its direction of movement is controlled by means of two electric switches 18 and 19. The switches are operated through the medium of an operating rod 20 which is connected to the piston rod 15 by a suitable connection 20′, so that it will move in unison with the movement of the piston rod 15.

Figure 7:
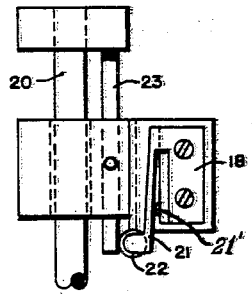
FIGURE 7 is a side elevation of an electrical switch and its operating mechanism employed in the operation of the staple feeding mechanism.
Figure 8:
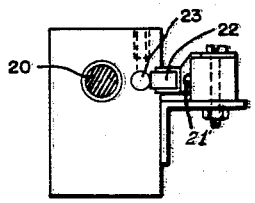
FIGURE 8 is a top plan of the switch and operating mechanism shown in FIGURE 7.

Details of the switch 18 and its operating mechanism are shown in FIGS. 7 and 8 of the drawings.

Figure 9:
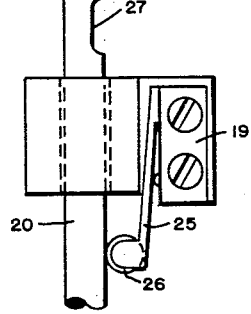
FIGURE 9 is a side elevation of another electrical switch and its operating mechanism which are employed in the staple feeding mechanism.
Figure 10:
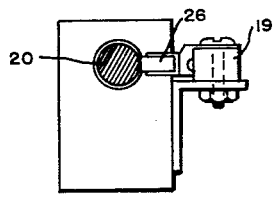
FIGURE 10 is a top plan of the switch and operating mechanism shown in FIGURE 9.
Figure 11:
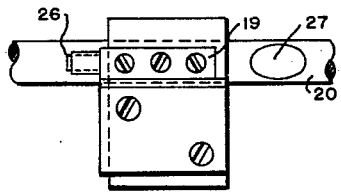
FIGURE 11 is an elevation taken at right angles to FIGURE 9 showing the switch and its operating mechanism.

The switch 18 is of any conventional structure adapted to make or break an electrical circuit therethrough for purposes hereinafter more specifically described, and the switch proper is moved into circuit making and breaking position by a lever 21 having a roller 22 on its free end. The roller 22 is engaged by a pin 23. The switch 19 which is shown in FIGS. 9 to 11, and which controls movement of the piston 17 and piston rod 15 in a reverse direction to that controlled by the switch 18, also embodies an electrical making and breaking switch of any approved structure which is operated by a lever 25 carrying a roller 26 on its free end. The roller 26 engages the rod 20 to maintain the switch 19 in one position and as the rod 20 moves in a piston receding movement it falls into a short depression 27 formed in the rod 20 to actuate the switch 19 as and for the purpose which will be disclosed in the description of the complete operating cycle of the staple feeding mechanism hereinafter contained.

The operating rod 20 has collars 28 and 29 mounted thereon which co-operate with the pin 23 in the operation of the mechanism. Their operation and function will be fully hereinafter explained.

The magazines 9 are all accurately spaced along the chains 8 and the mechanism for bringing them into staple dispensing position is co-related with them so that one magazine will be accurately positioned for dispensing staples at all times.

Any number of magazines 9 may be employed in the staple dispensing mechanism of given capacity, depending upon their length and upon the size of the staples used, but it will be readily seen that a relatively great number of staples may be carried, sufficient in many instances to last an entire working day, thereby eliminating time and labor loss of frequent refilling of a staple feeding mechanism as is required by those now on the market.

The mechanism for bringing the magazines into staple dispensing position includes an index cylinder 30. The index cylinder 30 and its co-acting elements float freely in the staple dispenser and are guided by a guide block 31. The piston rod 32 of the index cylinder 30 has a chain engaging and moving hook 33 thereon the upper surface of the outer edge of which is beveled as shown at 34 to ride over the rollers of the chains 8 while the under surface of its outer edge is concave as shown at 35 to engage the rollers of the chain and move the chain in a counter-clockwise direction upon movement of the piston rod 32 so as to move an empty magazine out of dispensing position and move a succeeding full magazine into dispensing position. The piston rod of the index cylinder is moved by any suitable power medium but preferably by air under pressure, and its directional movement is controlled by switches 36 and 37 in the manner hereinafter described. These switches 36 and 37 are of any approved type of switch similar to the switches 18 and 19 being operated by levers 38 and 39, each of which carry a roller 40 on its free end.

The floating index cylinder assembly is connected by a bar 41; which is pivotally connected to the cylinder 30 by a bracket 42 as at 43, to a bracket 44′ formed on one end of the chain guide 7. The chain guide 7 is pivotally connected to the front plate 1 by a pin 44 and its pivotal movement is limited by a second pin 45 which extends through an opening 46 in the guide. A spring 47, the tension of which is adjustable, as shown engages the chain guide and urges it into chain tightening position. This construction permits loosening of the chain tension in the event the tension is too heavy to move the chains by the hook 33, as in such instance the index cylinder will exert a pressure on the bar 41 which will cause the chain guide 7 to move on its pivot and relieve the tension on the chains, thus enabling the index-operation to take place with greater ease. Immediately after the indexing operation, the spring 47 will move guide 7 to its normal position. A spring $46^a$ engages the index cylinder 30 and urges it on its semi-pivotal support 48 to cause the outer edge of the hook 33 to engage between the rollers of the chains 8 so that it will always be in position to move the chains when its carrying piston rod 32 is retracted.

It is necessary to hold the magazines firmly in dispensing position while the staples therein are being dispensed and to provide this function a holding cylinder assembly is provided.

The holding cylinder assembly includes a holding cylinder 50. This cylinder 50 contains a piston 51 which is operated by any suitable operating means preferably air under pressure and the piston rod 52 has as cross bar 53 attached to its outer end. A pair of lock pins 54 are carried by the cross bar 53 and are positioned to engage between two rollers of each chain 8, as clearly shown in FIG. 6 when a magazine 9 is in staple dispensing position. These locking pins are moved out of locking position immediately upon the commencement of operation of the index cylinder assembly to move a full magazine into dispensing position.

Operation of the staple dispensing plunger 12 and its operating mechanism, operation of the indexing cylinder and its operating mechanism together with operation of the holding cylinder assembly are all co-ordinated and inter-connected to provide complete automatic operation of the staple feeding mechanism as will appear in the following description of operation of the mechanism.

Particular references to FIG. 1 of the drawings is had in the following description of operation.

Operation of the fastener feeding mechanism or device is started by closing the switch 60 in the electric current supply line 61 and opening the valve 62 in the compressed air line 63. The valve 62 may be left open at all times during operation of the fastener feeding mechanism and for convenience, the stopping and starting of the mechanism be completely under control of the switch 60.

When the mechanism is started with a magazine 9 in position of alignment with the openings 10 in the front and back plates 1 and 2, and with the fastener receiving chute 5 of the staple or fastener applying gun 3 the pressure of the compressed air against the under side of the piston 17 of the cylinder will through the connecting member 14 move the fastener moving plunger through the magazine 9 and dispense the fasteners 11 from the magazine 9 into the chute 5.

When the piston 17 reaches the end of the fastener feeding stroke, at which time the plunger 12 will have traveled the length of the magazine 9 and dispensed the last of the fasteners 11 from the magazine 9, the contact roller 22 of the switch structure 18 rises on the end of the maintained contact pin 23 which has been moved by the collar 29, fastened adjustably on the rod 20.

When the contact roller 22 rises on or engages the pin 23 the switch 18 will be operated to close the normally open electrical circuit through the switch 18. The switch 18 is of the ordinary two contact type electric switch with one wire (not shown) of an electrical circuit connected to the lever 21 and the other wire of the circuit connected to the contact 21' so that when the lever 21 engages the contact 21' an electrical circuit will be closed. This type of electrical switch is very common and well known.

The solenoid operated valve 65 is of any conventional three way solenoid operated valve and as clearly shown in FIG. 1 of the drawings, and it is connected in the electrical circuit 61 with the switch 18 and in the pressure air line 63 through two inlet ports 66 and 67. One of the outlet lines, namely, line 68 delivers compressed air to the end of the cylinder 16 through cylinder inlet 68' to exert feeding pressure or power against the piston 17 while the outlet line 69 delivers compressed air to the opposite end of the cylinder through cylinder inlet 69' to exert pressure against the piston 17 to retract the plunger 12 or move it to its initial feeding position just out of the end of the magazine 9.

Upon the closing of the normally open circuit through the switch 18, the solenoid valve 65 will be activated to deliver compressed air to the cylinder 16 through the port 69' to retract the piston 11 and plunger 12.

It is important to activate or energize the solenoid (not shown) of the solenoid valve 65 on the retracting stroke since it is essential that the spring return (not shown but a standard feature of such valves) in the solenoid, when the solenoid is de-energized by an open circuit through switch 18 causes compressed air to be fed to the opening 68' (or feed stroke side) of the cylinder 16 to insure pressure on the fasteners at all times except when the mechanism is indexing to move a subsequent full magazine into dispensing position.

When the piston 17 is retracting, and at a specific point during the retracting movement, the adjustable collar 28 engages the pin 23 and moves it so that contact roller 22 may resume its normal position for to open the circuit through the switch 18 to permit resumption of fastener feeding movement of the piston 17 and plunger 12.

It is necessary that this open position of the switch 18 is not resumed until the proper time (i.e. until a subsequent magazine 9 has been moved into fastener dispensing position) and therefore the pin 23 must have sufficient length to engage the roller 23 to maintain a closed circuit through the switch 18 to hold the piston 17 retracted until the magazine indexing operation is completed.

To provide operation of the indexing operation (i.e. the moving of a magazine 9 full, or partially full, of fasteners into fastener dispensing position) at the proper time interval the switch 18 is connected in series with the switch 36 as clearly shown in FIG. 1.

When the piston 17 is completely retracted contact roller 26 of switch 19 drops into the cutout or depression 27 in rod 20, thus operating the switch 19 through the lever 25 to activate or energize the solenoid valve 70 and de-energize the solenoid valve 80.

The solenoid valve 70 is a conventional three way solenoid valve of any approved type and is connected in the compressed air line 63 by a suitable connection 71 to its inlet port 72 and to opposite ends of the indexing cylinder 30 through lines 73 and 74 through the inlets 73' and 74' to the cylinder at its opposite ends.

The solenoid valve 80 is also a conventional type three way solenoid valve of any approved type; is connected in the electrical circuit with solenoid valves 65 and 70 and the control switches to provide sequence operation as described herein and as clearly shown in FIG. 1. The solenoid valve 80 is connected in the compressed air line to receive compressed air through the branch line 81 and through the two outlet lines 82 and 83 to the inlets 82' and 83' of the holding cylinder 50.

When the solenoid (not shown) of the solenoid valve 80 is de-energized the mechanism of the valve comes into play and operates the valve to permit transmission of compressed air into the holding cylinder 50 through inlet 82' to retract the piston 51 and move the holding pins 54 out of the holding contact with the magazine carrying chains 8. At the same time the solenoid of valve 70 is energized and operates to permit delivery of compressed air to the inlet 74' of the indexing cylinder 30 to move the indexing chain engaging hook 33 in chain moving action to bring a subsequent magazine 9 into fastener dispensing position, and at the same time moving the empty magazine out of fastener dispensing position.

As the hook 33 moves, the control rod 90 moves with it.

This control rod 90 is connected to the piston rod 32 in any suitable manner and is guided in its movement by suitable guides 91. The control rod 90 has a notch or depression 92 cut therein.

As the control rod 90 moves the roller 40 of switch 36 will be moved out of the depression 92 and actuate the lever 38 and open the normally closed switch 36 causing deenergizing of the solenoid (not shown) of the solenoid switch 65 operating the valve to permit entrance of compressed air to cylinder 16 through port 68' to start a new feeding stroke of piston 16' and plunger 12.

Also at this time the contact roller 40 on lever 39 of switch 37 will move into the depression 92 and operate lever 39 to close the switch 37 and energize solenoid valve 80, operating this solenoid valve 80 to permit entrance of compressed air or activating fluid into holding cylinder 50 through port 83' to move holding pins 54 into holding engagement with the chains 8, slightly before the end of the chain moving or indexing movement of hook 33.

The switches 36 and 37 are so located in relation to the depression 92 that the holding pins will engage the chains at approximately completion of two thirds of the indexing stroke or movement of hook 33 and the piston 17 will start on its feeding stroke at completion of approximately seven-eighths of the indexing movement of hook 33.

As soon as the piston 17 starts on the fastener feeding stroke contact roller 26 of switch 19 will move out of the depression 27 and activate switch 19 to reverse the electrical current flow through various of the switches and cause activation of the solenoid valves 70 and 80 to alter the flow of compressed air to the indexing cylinders 30 to return the hook 33 to the normal starting position of its working or indexing stroke and to hold the holding pins in chain holding position.

As the contact rod 20 moves forward on the fastener feeding stroke the collar 28 will move away from the contact roller 23 and pin 23 will move out of contact with the roller 23 and operate switch 18 to open the circuit to the solenoid valve 65 and permit the feeding stroke to continue through its cycle. It will be noted from above that the switch 19 had previously started the feed stroke of piston 17 a short instant before the completion of the indexing stroke, thus insuring speedy accurate operation of the fastener feeding mechanism.

The solenoid valve structures 65, 70 and 80 are provided with exhaust ports 100 to permit bleeding of compressed air from the respective cylinders 16, 30 and 60 as required.

If desired standard pressure reducers and speed control valves, as shown at 102 and 103 may be interposed in the compressed air lines as shown in FIG. 1.

During the operation of the fastener feeding mechanism as above described should a magazine 9 which does not contain any fasteners be brought into fastener dispensing position, the plunger 12 moving through the empty magazine will cause inauguration of the retracting operation of the plunger and the subsequent operation of the indexing hooks and holding pins, resulting in the bringing of a subsequent magazine into dispensing position. Ths sequence of operatons will be continued until a magazine holding fastener is brought into dispensing position. Thus it will be seen that the fastener feeding mechanism will perform a fastener hunting operation until fasteners are located without manual assistance, should it be desirable under certain conditions to operate the mechanism with part of the magazines unloaded prior to being brought into fastener dispensing position.

What is claimed is:

1. In combination means for feeding staples to a stapling machine including a carrying member, a plurality of staple carrying magazines carried in spaced relation on said carrying member each magazine carrying a plurality of staples, means for moving said magazines into staple dispensing position relative to said stapling machine, means for moving staples individually from the magazine into a stapling machine at intervals as required by the stapling machine, and means for holding said magazines in staple dispensing position until all of the staples have been dispensed therefrom.

2. The combination as claimed in claim 1, including means operated by movement of said staple moving means to control operation of said magazine moving means.

3. The combination as claimed in claim 2, including means operated by movement of said staple moving means to control operation of said holding means.

4. The combination as claimed in claim 1, wherein said holding means includes a power operated cylinder and piston structure, at least one locking pin movable upon movement of said piston into and out magazine holding position, and means controlled by movement of said staple moving means for controlling operation of said piston.

5. The combination as claimed in claim 4, wherein said means for moving said magazines into staple dispensing position includes a power operated cylinder and piston structure, and means operated by movement of said staple moving means for controlling operation of said magazine moving means.

6. In a feeding apparatus for feeding fastening devices to a staple applying gun, at least one flexible carrying member, a plurality of fastener carrying magazines spaced along and carried by said carrying member, a plurality of fasteners in each magazine means including power operated mechanism for moving said magazines into fastener dispensing position, means for moving said fastening devices individually out of a magazine in dispensing position into a staple applying gun as required by the gun, and means operated by said fastener moving means for controlling operation of said power operated mechanism to move one magazine out of dispensing position upon the dispensing of the last fastening device therefrom and to move the next successive magazine on the carrying member into dispensing position.

7. A fastener feeding apparatus as claimed in claim 6, including a holding member for holding the magazines firmly in position during the moving of fasteners therefrom, means for moving said holding member out of holding position upon the emptying of fasteners from the magazine in fastener dispensing position and moving the holding member into holding position upon the positioning of a full magazine into fastener dispensing position.

8. In feeding apparatus for feeding fastening devices into a fastener applying gun as claimed in claim 6, wherein, said fastener moving means including a fastener engaging plunger, power operated means for moving said plunger, means operated by operation of said power operated means for reversing the direction of movement of the plunger when the last fastening device has been fed from the magazine into the staple applying machine to retract the plunger from the magazine and position it for subsequent movement into a succeeding full magazine.

9. A feeding mechanism as claimed in claim 8, including a connecting member formed of a plurality of independent laminated thin metal strips connecting the plunger to its power operated operating means.

10. In a feeding apparatus for feeding fastening devices to a fastening device applying gun, at least one flexible carrying mmeber, a plurality of fastener carrying magazines carried by said flexible carrying member, means for applying tension to said carrying member, a hook for engaging and moving said carrying member, means for moving said hook in flexible member moving operation, and means for relieving the tension on said flexible member during its movement and reapplying the tension upon stoppage of movement of the carrying member.

11. In a feeding mechanism for feeding fasteners to a fastener applying gun, a magazine for holding fasteners to be fed to the gun, a plunger for movement through the magazine to move fasteners therefrom into the gun, a power operated piston and cylinder structure, means connecting the piston to said plunger for moving the plunger by movement of the piston, a valve for controlling delivery of a power operating medium to the cylinder, an operation controlling rod connected to and moving with the piston, means for operating said valve, and means operated by movement of said rod to control operation of said valve operating means to control the directional movement of said piston.

12. In a feeding mechanism for feeding fasteners to a fastener applying gun, at least one carrying member, a plurality of fastener carrying magazines carried by said carrying member, a carrying member moving means including a hook for engaging and moving said carrying member, a power operated piston and cylinder, a piston rod connecting said hook to said piston for movement therewith, a valve for controlling the delivery of piston moving energy fluid to said cylinder, and means operated by movement of said piston rod for controlling operation of said valve.

13. A feeding mechanism as claimed in claim 12, including at least one holding pin for engagement with said carrying member to securely hold it in adjusted position, a power operated piston and cylinder structure for moving said holding pin into and out of engagement with said carrying member, a valve for controlling flow of operating medium to said last named piston and cylinder structure, and means for controlling operation of said valve to cause movement of said holding pin out of engagement with said carrying member upon movement of said hook in carrying member moving operation.

14. In a feeding mechanism for feeding fasteners to a fastener applying gun, an endless carrying member, a plurality of fastener carrying magazines carried by said carrying member, guides for guiding movement of said carrying member, means rigidly supporting one of said guides, means supporting the other of said guides for pivotal movement, a spring engaging said pivoted guide to apply tension on said endless carrying member, means for moving said carrying member to move the magazines into fastener dispensing position, and means connecting said carrier moving means and said pivoted guide to relieve the tension on the carrying member during movement of the carrying member.

15. A fastener feeding mechanism as claimed in claim 14, including a plunger for moving fasteners from a magazine to a fastener applying gun when the magazine is in fastener position, means for moving said plunger in fastener moving direction and in retracting movement out of the magazine when it is empty, and means operated and controlled by said plunger moving means for controlling operation of said carrying member moving means.

16. In a fastener feeding apparatus for feeding fasteners to a fastener applying gun, front and back plates, chain guides carried by said plates, a pair of endless chains about said guides and in parallel relation to each other, fastener holding magazines attached to said chains at spaced intervals, said front and back plates provided with fastener dispensing openings therein, an indexing hook engaging said chains to move the chains to position the magazines one after another in alignment with said dispensing openings, means for operating said indexing hook, a plunger for moving fasteners out of a magazine when it is in alignment with said dispensing openings, means for operating said plunger, holding pins for engagement with said chains to hold them in adjusted position, and means for moving said holding pins into and out of engagement with said chains.

17. In combination, means for feeding staples to a stapling machine including a carrying member, a plurality of staple carrying magazines carried in spaced erlation on said carrying member, each of said magazines carrying a plurality of staples, means for moving said carrying member to move magazines into staple dispensing position step by step operation of said carrying member, whereby each magazine on the carrying member is moved into dispensing position in succession of the magazine next in advance thereof, means for moving staples individually from the magazine into a stapling machine at intervals as required by a stapling machine, and means for locking said magazines in dispensing position as it is brought into such position.

18. The combination as claimed in claim 17 including means operated upon the dispensing of the last staple from a magazine for releasing said locking means.

19. The combination as claimed in claim 18, including means for operating said carrier moving means upon release of said locking means.

References Cited in the file of this patent
UNITED STATES PATENTS

| | | |
|---|---|---|
| 692,757 | Barber | Feb. 4, 1902 |
| 2,285,435 | Holcomb | June 9, 1942 |
| 2,439,189 | Schafroth | Apr. 6, 1948 |